United States Patent
Tokolics et al.

[15] 3,671,519
[45] June 20, 1972

[54] N-SUBSTITUTED 2,3,4,5,-TETRAHYDRO-1H-3-BENZAZEPINES

[72] Inventors: Joseph Tokolics, King of Prussia; Gordon A. Hughes, Haverford; Herchel Smith, Wayne, all of Pa.

[73] Assignee: American Home Products Corporation, New York, N.Y.

[22] Filed: July 14, 1969

[21] Appl. No.: 860,449

Related U.S. Application Data

[62] Division of Ser. No. 572,676, Aug. 16, 1966, Pat. No. 3,483,185.

[52] U.S. Cl. ......................................................260/239 BB
[51] Int. Cl. ...............................................................C07d 41/08
[58] Field of Search ............................................260/239 BB

[56] References Cited

UNITED STATES PATENTS 3,258,459   6/1966   Yale et al.................................260/239
3,055,883   9/1962   Mull........................................260/239

FOREIGN PATENTS OR APPLICATIONS 822,506   10/1959   Great Britain.........................260/239

OTHER PUBLICATIONS

Houben–Weyl, " Methoden Der Organischen Chemie," Vol. 11/1, (Stuttgart, 1957), pages 982– 985. QD 258H7.

*Primary Examiner*—Alton D. Rollins
*Attorney*—John J. Hagan, John Legdey, Andrew Kafko, Edmund H. O'Brien, Joseph Martin Weigman and Dwight J. Potter

[57]  ABSTRACT

N-substituted-2,3,4,5-tetrahydro-1H-3-benzazepines are prepared having pharmacological activity including analgesic and hypoglycemic action.

10 Claims, No Drawings

N-SUBSTITUTED 2,3,4,5,-TETRAHYDRO-1H-3-BENZAZEPINES

The present application is a divisional application of Ser. No. 572,676, filed Aug. 16, 1966 now U.S. Pat. No. 3,483,185 issued Dec. 9, 1969.

This invention relates to and has for its objects the provision of new physiologically active compounds, novel processes for their production and new intermediates useful in the preparation thereof.

More particularly, this invention relates to compounds of the formula (I):

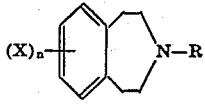

and the acid-addition salts thereof, wherein X is hydrogen, lower alkyl, lower alkoxy, benzyloxy, lower alkyl mercapto, di(lower alkyl)amino, halo or trifluoromethyl; n is one, two or three; and R is amino, di(lower alkyl)amino alkyl, carboximidoylguanidine, sulfonamoyl and N,N-di(lower alkyl)sulfamoyl.

The terms "lower alkyl" and "lower alkoxy", as employed herein, include both straight and branched chain radicals of less than eight carbon atoms.

As to salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric acid and hydrobromic acid), sulfuric acid, nitric acid, boric acid and phosphoric acid, and organic acids such as maleic, methane sulfonic, cyclohexane sulfanic, tartaric, citric, acetic and succinic acid.

The compounds of this invention, including the acid-addition salts thereof, are therapeutically active substances which are useful as analgesic and hypoglycemic agents.

The compounds may be formulated for such administration, the concentration and/or dosage being based on the activity of the particular compound and the requirements of the patient.

The compounds of this invention can be prepared by a variety of methods.

One suitable method involves the reaction of a compound of the formula (II):

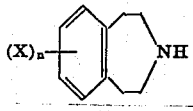

wherein X and n are as hereinbefore defined, with a compound of the formula (III):

R—(halo)

wherein the halo is preferably chloro, and R is as hereinbefore defined. A second method involves heating the compound of formula (II), or its salt, at elevated temperatures, with a sulfonamide in a basic medium. Another method involves reducing a compound of the formula (IV):

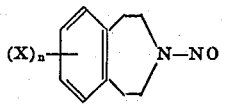

wherein X and n are as hereinbefore defined, with a reducing agent, such as lithium aluminum hydride, to yield a compound of the formula (V):

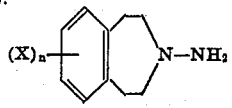

wherein X and n are as hereinbefore defined, one of the final products of this invention.

A still further method of preparing the N-substituted carboximidoylguanidine derivatives of compounds of formula I is to react dicyanodiamide at elevated temperatures with the free bases or salts of the compounds of formula II.

Among the suitable starting materials of formula II can be mentioned 2,3,4,5-tetrahydro-1H-3-benzazepine; 2,3,4,5,-tetrahydro-7-halo-1H-3-benzazepine (e.g., 2,3,4,5-tetrahydro-7-chloro-1H-3-benzazepine); 2,3,4,5-tetrahydro-7-trifluoromethyl-1H-3-benzazepine; 2,3,4,5-tetrahydro-7-alkoxy-1H-3-benzazepine (e.g., 2,3,4,5-tetrahydro-7-methoxy-1 H-3-benzazepine); 2,3,4,5-tetrahydro-7-lower alkyl-1H-3-benzazepine (e.g., 2,3,4,5-tetrahydro-7-methyl-1H-3-benzazepine); 2,3,4,5-tetrahydro-8-benzyloxy-1H-3-benzazepine; 2,3,4,5-tetrahydro-8-di(lower alkyl)amino-1H-3-benzazepine (e.g., 2,3,4,5-tetrahydro-8-dimethylamino-1H-3-benzazepine); 2,3,4,5-tetrahydro-8-methylmercapto-1H-3-benzazepine; 2,3,4,5-tetrahydro-7, 8-dihalo-1H-3-benzazepine (e.g., 2,3,4,5-tetrahydro-7,8-dichloro-1H-3-benzazepine); 2,3,4,5-tetrahydro-7-halo-8-trifluoromethyl-1H-3-benzazepine (e.g., 2,3,4,5-tetrahydro-7-chloro-8-trifluoromethyl-1H-3-benzazepine); 2,3,4,5-tetrahydro-7,8-dialkyl-1H-3-benzazepine (e.g., 2,3,4,5-tetrahydro-7,8-dimethyl-1H-3-benzazepine); 2,3,4,5-tetrahydro-7,8-dialkoxy-1H-3-benzazepine (2,3,4,5-tetrahydro-7,8-dimethoxy-1H-3-benzazepine); 2,3,4,5-tetrahydro-6,8-dichloro-1H-3-benzazepine, and the like.

Among the suitable starting materials of formula III can be mentioned dialkylamino alkyl halide (e.g., dimethylamino propyl chloride; dimethylaminoethyl chloride); N,N-dialkyl sulfonyl halide (e.g., N,N-dimethyl sulfonyl chloride); sulfonyl chloride; and the like.

The following examples illustrate the invention (all temperatures being in centigrade).

EXAMPLE 1

3-[3-(Dimethylamino)propyl]-2,3,4,5-tetrahydro-1H-3-benzazepine, dihydrochloride A mixture of 2.0 gm. of 2,3,4,5-tetrahydro-1H-3-benzazepine, 60.0 ml. of n-propanol, 2.0 gm. of potassium carbonate and 2.0 gm. of dimethylaminopropyl chloride is refluxed for 5 hours. The mixture is cooled, filtered and the solvent is removed by evaporation in vacuo. The residue is then dissolved in 10% sodium hydroxide solution and extracted with ether. The ether layer is washed with water, brine, dried with sodium sulfate, and then treated with hydrogen chloride. The resulting precipitate is filtered and recrystallized from ethanol to yield 3-[3-(dimethylamino)propyl]-2,3,4,5-tetrahydro-1H-3-benzazepine, dihydrochloride having a melting point of 287°–290°.

Anal. Calcd. For $C_{15}H_{26}N_2Cl_2$: C,59.01; H,8.58; N,9.17; Cl,23.22; Found: C,58.82; H,8.76; N,9.25; Cl,23.00.

EXAMPLE 2

3-[3-(Dimethylamino)propyl]-7-chloro-2,3,4,5-tetrahydro-1H-3-benzazepine, dihydrochloride Following the procedure of Example 1, but substituting 2,3,4,5-tetrahydro-7-chloro-1H-3-benzazepine for 2,3,4,5-tetrahydro-1H-3-benzazepine there is obtained 3-[3-(dimethylamino)propyl]7-chloro-2,3,4,5-tetrahydro-1H-3-benzazepine, dihydrochloride.

EXAMPLE 3

3-[3-(Dimethylamino)propyl]-7-methyl-2,3,4,5-tetrahydro-1H-3-benzazepine, dihydrochloride Following the procedure of Example 1, but substituting 2,3,4,5-tetrahydro-7-methyl-1H-3-benzazepine for 2,3,4,5-tetrahydro-1H-3-benzazepine there is obtained 3-[3-(dimethylamino)propyl]7-methyl-2,3,4,5-tetrahydro-1H-3-benzazepine, dihydrochloride.

EXAMPLE 4

3-[3-(Dimethylamino)propyl]-7-methoxy-2,3,4,5-tetrahydro-1H-3-benzazepine, dihydrochloride Following the procedure of Example 1, but substituting 2,3,4,5-tetrahydro-7-methoxy-1H-3-benzazepine for 2,3,4,5-tetrahydro-1H-3-benzazepine there is obtained 3-[3-(dimethylamino)propyl]7-methoxy-2,3,4,5-tetrahydro-1H-3-benzazepine, dihydrochloride.

EXAMPLE 5

3-[3-(Dimethylamino)propyl]-7-trifluoromethyl-2,3,4,5-tetrahydro-1H-3-benzazepine, dihydrochloride Following the procedure of Example 1, but substituting 2,3,4,5-tetrahydro-7-trifluoromethyl-1H-3-benzazepine for 2,3,4,5-tetrahydro-1H-3-benzazepine there is obtained 3-[3-(dimethylamino)propyl]7-trifluorometyyl-2,3,4,5-tetrahydro-1H-3-benzazepine, dihydrochloride.

EXAMPLE 6

3-[3-(Dimethylamino)propyl]-7-benzyloxy-2,3,4,5-tetrahydro-1H-3-benzazepine, dihydrochloride Following the procedure of Example 1, but substituting 2,3,4,5-tetrahydro-7-benzyloxy-1H-3-benzazepine for 2,3,4,5-tetrahydro-1H-3-benzazepine there is obtained 3-[3-(dimethylamino)propyl]7-benzyloxy-2,3,4,5-tetrahydro-1H-3-benzazepine, dihydrochloride.

EXAMPLE 7

3-[3-(Dimethylamino)propyl]-7,8-dichloro-2,3,4,5-tetrahydro-1H-3-benzazepine, dihydrochloride Following the procedure of Example 1, but substituting 2,3,4,5-tetrahydro-7,8-dichloro-1H-3-benzazepine for 2,3,4,5-tetrahydro-1H-3-benzazepine there is obtained 3-[3-(dimethylamino)propyl]7,8-dichloro-2,3,4,5-tetrahydro-1H-3-benzazepine, dihydrochloride.

EXAMPLE 8

3-[3-(Dimethylamino)propyl]-7,8-dimethoxy-2,3,4,5-tetrahydro-1H-3-benzazepine, dihydrochloride Following the procedure of Example 1, but substituting 2,3,4,5-tetrahydro-7,8-dimethoxy-1H-3-benzazepine for 2,3,4,5-tetrahydro-1H-3-benzazepine there is obtained 3-[3-(dimethylamino)propyl]7,8-dimethoxy-2,3,4,5-tetrahydro-1H-3-benzazepine, dihydrochloride.

EXAMPLE 9

3-[3-(Dimethylamino)propyl]-7,8-dimethyl-2,3,4,5-tetrahydro-1H-3-benzazepine, dihydrochloride Following the procedure of Example 1 but substituting 2,3,4,5-tetrahydro-7,8-dimethyl-1H-3-benzazepine for 2,3,4,5-tetrahydro-1H-3-benzazepine there is obtained 3-[3-(dimethylamino)propyl]7,8-dimethyl-2,3,4,5-tetrahydro-1H-3-benzazepine, dihydrochloride.

EXAMPLE 10

[3-(2,3,4,5-Tetrahydro-1H-3-benzazepine)carboximidoyl]guanidine, hydrochloride

A mixture of 2.2 gm. of 2,3,4,5-tetrahydro-1H-3-benzazepine hydrochloride and 1.1 gm. of dicyanodiamide is fused at 145°–150° under nitrogen for five hours. The reaction mixture is permitted to stand overnight at room temperature and then the crude product is recrystallized from absolute ethanol to yield 1.6 gm. of [3-(2,3,4,5-tetrahydro-1H-3-benzazepine)carboximidoyl]guanidine, hydrochloride, having a melting point of 230°–232°.

Anal. Calcd. for $C_{12}H_{17}N_5 \cdot HCl$: C,53.82; H,6.77; N,26.14; Cl,13.24;

Found: C,53.50; H,6.60; N,26.42; Cl,13.35.

EXAMPLE 11

[3-(2,3,4,5-Tetrahydro-7-chloro-1H-3-benzazepine)carboximidoyl]guanidine, hydrochloride Following the procedure of Example 10, but substituting 2,3,4,5-tetrahydro-7-chloro-1H-3-benzazepine hydrochloride for 2,3,4,5-tetrahydro-1H-3-benzazepine hydrochloride there is obtained [3-(2,3,4,5-tetrahydro-7-chloro-1H-3-benzazepine)carboximidoyl]guanidine, hydrochloride.

EXAMPLE 12

]3-(2,3,4,5-Tetrahydro-7-methyl-1H-3-benzazepine)carboximidoyl]guanidine, hydrochloride Following the procedure of Example 10, but substituting 2,3,4,5-tetrahydro-7-methyl-1H-3-benzazepine hydrochloride for 2,3,4,5-tetrahydro-1H-3-benzazepine hydrochloride there is obtained [3-(2,3,4,5-tetrahydro-7-methyl-1H-3-benzazepine)carboximidoyl]guanidine, hydrochloride.

EXAMPLE 13

[3-(2,3,4,5-Tetrahydro-7-methoxy-1H-3-benzazepine)carboximidoyl]guanidine, hydrochloride Following the procedure of Example 10, but substituting 2,3,4,5,-tetrahydro7-methoxy-1H-3-benzazepine hydrochloride for 2,3,4,5-tetrahydro-3-benzazepine hydrochloride there is obtained [3-(2,3,4,5-tetrahydro-7-methoxy-1H-3-benzazepine)carboximidoyl]guanidine, hydrochloride.

EXAMPLE 14

[3-(2,3,4,5Tetrahydro-7-benzyloxy-1H-3-benzazepine)carboximidoyl]guanidine, hydrochloride Following the procedure of Example 10, but substituting 2,3,4,5-tetrahydro-7-benzyloxy-1H-3-benzazepine hydrochloride for 2,3,4,5-tetrahydro-1H-3-benzazepine hydrochloride there is obtained [3-(2,3,4,5-tetrahydro-7-benzyloxy-1H-3-benzazepine)carboximidoyl]guanidine, hydrochloride.

EXAMPLE 15

[3-(2,3,4,5-Tetrahydro-7-trifluoromethyl-1H-3-benzazepine)carboximidoyl]guanidine, hydrochloride Following the procedure of Example 10, but substituting 2,3,4,5-tetrahydro-7-trifluoromethyl-1H-3-benzazepine hydrochloride for 2,3,4,5-tetrahydro-1H-3-benzazepine hydrochloride there is obtained [3-(2,3,4,5-tetrahydro-7-trifluoromethyl-1H-3-benzazepine)carboximidoyl]guanidine, hydrochloride.

EXAMPLE 16

[3-(2,3,4,5-Tetrahydro-7,8-dichloro-1H-3-benzazepine)carboximidoyl]guanidine, hydrochloride Following the procedure of Example 10, but substituting 2,3,4,5-tetrahydro-7,8-dichloro-1H-3-benzazepine hydrochloride for 2,3,4,5-tetrahydro-1H-3-benzazepine hydrochloride there is obtained [3-(2,3,4,5-tetrahydro-7,8-dichloro-1H-3-benzazepine)carboximidoyl]guanidine, hydrochloride.

EXAMPLE 17

[3-(2,3,4,5-Tetrahydro-7,8-dimethoxy-1H-3-benzazepine)carboximidoyl] guanidine, hydrochloride Following the procedure of Example 10, but substituting 2,3,4,5-tetrahydro-7,8-dimethoxy-1H-3-benzazepine hydrochloride for 2,3,4,5-tetrahydro-1H-3-benzazepine hydrochloride there is obtained [3-(2,3,4,5-tetrahydro-7,8-dimethoxy-1H-3-benzazepine)carboximidoyl] guanidine, hydrochloride.

EXAMPLE 18

[3-(2,3,4,5-Tetrahydro-7,8-dimethyl-1H-3-benzazepine)carboximidoyl]guanidine, hydrochloride Following the procedure of Example 10, but substituting 2,3,4,5-tetrahydro-7,8-dimethyl-1H-3-benzazepine hydrochloride for 2,3,4,5-tetrahydro-1H-3-benzazepine hydrochloride there is obtained [3-(2,3,4,5-tetrahydro-7,8-dimethyl-1H-3-benzazepine)carboximidoyl] guanidine, hydrochloride.

EXAMPLE 19

2,3,4,5-Tetrahydro-N,N-dimethyl-1H-3-benzazepine-3-sulfonamide

To a mixture of 4.0 gm. of 2,3,4,5-tetrahydro-1H-3-benzazepine and 20 ml. of toluene at −20° is slowly added 1.96 gm. of N,N-dimethyl sulfonyl chloride. The mixture is then stirred at room temperature for 18 hours. The solvent is evaporated in vacuo and the residue is recrystallized from methanol-water to yield 2.64 gm. of 2,3,4,5-tetrahydro-N,N-dimethyl-1H-3-benzazepine-3-sulfonamide having a melting point of 108°–110°.

Anal. Calcd. for $C_{12}H_{18}N_2O_2S$: C,56.67; H,7.13; N,11.02; S,12.60;

Found: C,56.88; H,7.26; N,10.84; S,12.65.

EXAMPLE 20

2,3,4,5-Tetrahydro-7-chloro-N,N-dimethy-1H-3-benzazepine-3-sulfonamide

Following the procedure of Example 19, but substituting 2,3,4,5-tetrahydro-7-chloro-1H-3-benzazepine for 2,3,4,5-tetrahydro-1H-3-benzazepine there is obtained 2,3,4,5-tetrahydro-7-chloro-N,N-dimethyl-1H-3-benzazepine-3-sulfonamide.

EXAMPLE 21

2,3,4,5-Tetrahydro-7-methyl-N,N-dimethyl-1H-3-benzazepine-3-sulfonamide

Following the procedure of Example 19, but substituting 2,3,4,5-tetrahydro-7-methyl-1H-3-benzazepine for 2,3,4,5-tetrahydro-1H-3-benzazepine there is obtained 2,3,4,5-tetrahydro-7-methyl-N,N-dimethyl-1H-3-benzazepine-3-sulfonamide.

EXAMPLE 22

2,3,4,5-Tetrahydro-7-methoxy-N,N-dimethyl-1H-3-benzazepine-3-sulfonamide

Following the procedure of Example 19, but substituting 2,3,4,5-tetrahydro-7-methoxy-1H-3-benzazepine for 2,3,4,5-tetrahydro-1H-3-benzazepine there is obtained 2,3,4,5-tetrahydro-7-methyl-N,N,-dimethyl-1H-3-benzazepine-3-sulfonamide.

EXAMPLE 23

2,3,4,5-Tetrahydro-7-trifluoromethyl-N,N-dimethyl-1H-3-benzazepine-3-sulfonamide Following the procedure of Example 19, but substituting 2,3,4,5-tetrahydro-7-trifluoromethyl-1H-3-benzazepine for 2,3,4,5-tetrahydro-1H-3-benzazepine there is obtained 2,3,4,5-tetrahydro-7-trifluoromethyl-N,N-dimethyl-1H-3-benzazepine-3-sulfonamide.

EXAMPLE 24

2,3,4,5-Tetrahydro-7,8-dichloro-N,N-dimethyl-1H-3-benzazepine-3-sulfonamide

Following the procedure of Example 19, but substituting 2,3,4,5-tetrahydro-7,8-dichloro-1H-3-benzazepine for 2,3,4,5-tetrahydro-1H3-benzazepine there is obtained 2,3,4,5-tetrahydro-7,8-dichloro-N,N-dimethyl-1H-3-benzazepine-3-sulfonamide.

EXAMPLE 25

2,3,4,5-Tetrahydro-7,8-dimethoxy-N,N-dimethyl-1H-3-benzazepine-3-sulfonamide

Following the procedure of Example 19, but substituting 2,3,4,5-tetrahydro-7,8-dimethoxy-1H-3-benzazepine for 2,3,4,5-tetrahydro-1H-3-benzazepine there is obtained 2,3,4,5-tetrahydro-7,8-dimethoxy-N,N-dimethyl-1H-3-benzazepine-3-sulfonamide.

EXAMPLE 26

2,3,4,5-Tetrahydro-7,8-dimethyl-N,N-dimethyl-1H-3-benzazepine-3-sulfonamide

Following the procedure of Example 19, but substituting 2,3,4,5-tetrahydro-7,8-dimethyl-1H-3-benzazepine for 2,3,4,5-tetrahydro-1H-3-benzazepine there is obtained 2,3,4,5-tetrahydro-7,8-dimethyl-N,N-dimethyl-1H-3-benzazepine-3-sulfonamide.

EXAMPLE 27

2,3,4,5-Tetrahydro-1H-3-benzazepine-3-sulfonamide

A mixture of 1.4 gm. of 2,3,4,5-tetrahydro-1H-3-benzazepine, 20 ml. of pyridine and 1.9 gm. of sulfonamide is refluxed until there is no gas evolution detected. The solvent is removed by evaporation in vacuo and the residue is recrystallized from methanol-water to yield 0.76 gm. of 2,3,4,5-tetrahydro-1H-3-benzazepine-3-sulfonamide having a melting point of 170°–173°.

Anal. Calcd. For $C_{10}H_{14}N_2O_2S$: C,53.07; H,6.23; N,12.38; S,14.17;

Found: C,53.44; H,6.24; N,12.50; S,14.17.

EXAMPLE 28

2,3,4,5-Tetrahydro-7-chloro-1H-3-benzazepine-3-sulfonamide.

Following the procedure of Example 27, but substituting 2,3,4,5-tetrahydro-7-chloro-1H-3-benzazepine for 2,3,4,5-tetrahydro-1H-3-benzazepine there is obtained 2,3,4,5-tetrahydro-7-chloro-1H-3-benzazepine-3-sulfonamide.

EXAMPLE 29

2,3,4,5-Tetrahydro-7-methyl-1H-3-benzazepine-3-sulfonamide.

Following the procedure of Example 27, but substituting 2,3,4,5-tetrahydro-7-methyl-1H-3-benzazepine for 2,3,4,5-tetrahydro-1H-3-benzazepine there is obtained 2,3,4,5-tetrahydro-7-methyl-1H-3-benzazepine-3-sulfonamide.

EXAMPLE 30

2,3,4,5-Tetrahydro-7-methoxy-1 H-3-benzazepine-3-sulfonamide.

Following the procedure of Example 27, but substituting 2,3,4,5-tetrahydro-7-methoxy-1H-3-benzazepine for 2,3,4,5,-tetrahydro-1H-3-benzazepine there is obtained 2,3,4,5-tetrahydro-7-methoxy-1H-3-benzazepine-3-sulfonamide.

EXAMPLE 31

2,3,4,5-Tetrahydro-7-trifluoromethyl-1H-3-benzazepine-3-sulfonamide.

Following the procedure of Example 27, but substituting 2,3,4,5-tetrahydro-7-trifluoromethyl-1H-3-benzazepine for 2,3,4,5-tetrahydro-1H-3-benzazepine there is obtained 2,3,4,5-tetrahydro-7-trifluoromethyl-1H-3-benzazepine-3-sulfonamide.

EXAMPLE 32

2,3,4,5-Tetrahydro-7,8-dichloro-1H-3-benzazepine-3-sulfonamide.

Following the procedure of Example 27, but substituting, 2,3,4,5-tetrahydro-7,8-dichloro-1H-3-benzazepine for 2,3,4,5-tetrahydro-1H-3-benzazepine there is obtained 2,3,4,5-tetrahydro-7,8-dichloro-1H-3-benzazepine-3-sulfonamide.

EXAMPLE 33

2,3,4,5-Tetrahydro-7,8-dimethoxy-1H-3-benzazepine-3-sulfonamide

Following the procedure of Example 27, but substituting 2,3,4,5-tetrahydro-7,8-dimethoxy-1H-3-benzazepine for 2,3,4,5-tetrahydro-1H-3-benzazepine there is obtained 2,3,4,5-tetrahydro-7,8-dimethoxy-1H-3-benzazepine-3-sulfonamide.

EXAMPLE 34

2,3,4,5-Tetrahydro-7,8-dimethyl-1H-3-benzazepine-3-sulfonamide

Following the procedure of Example 27, but substituting 2,3,4,5-tetrahydro7,8-dimethyl-1H-3-benzazepine for 2,3,4,5-tetrahydro-1H-3-benzazepine there is obtained 2,3,4,5-tetrahydro-7,8-dimethyl-1H-3-benzazepine-3-sulfonamide.

EXAMPLE 35

3-Amino-2,3,4,5-tetrahydro-1H-3-benzazepine, hydrochloride

A solution of 2,3,4,5-tetrahydro-1H-3-benzazepine hydrochloride (2.0 g.) in 5% hydrochloric acid (4.0 ml.) is added dropwise to a solution of sodium nitrite (2.0 g.) in water (4.0 ml.) at 0°. After standing at 25° for 2 hours the product is filtered and recrystallized from aqueous methanol to give N-nitrono-2,3,4,5-tetrahydro-1H-3-benzazepine (1.25 g.) m.p. 64°–67.

To a solution of 0.7 gm. of N-nitroso-2,3,4,5-tetrahydro-1H-3-benzazepine in 10 ml. of ether at 10° is added 0.25 gm. of lithium aluminum hydride in 10 ml. of ether. After standing at 10° for 1 hour, the excess lithium aluminum hydride is decomposed by adding 10 ml. of wet tetrahydrofuran followed by 50 ml. of a 30 percent solution of potassium sodium tartarate. The aqueous phase is separated and extracted with ether. The ethereal solutions are combined, washed with water, brine solution and then ether previously equilibrated with anhydrous hydrogen chloride is added. The resulting precipitate is filtered and recrystallized from absolute ethanol to yield 0.45 gm. of 3-amino-2,3,4,5-tetrahydro-1H-3-benzazepine, hydrochloride having a melting point of 197-199°

Anal. Calcd. for $C_{10}H_{15}N_2 \cdot HCl$: C, 60.44; H, 7.61; N, 14.10; Cl, 17.80;

Found: C, 60.10; H, 7.55; N, 14.10; Cl, 17.70.

EXAMPLE 36

3-Amino-2,3,4,5-tetrahydro-7-chloro-1H-3-benzazepine, hydrochloride

Following the procedure of Example 35, but substituting 2,3,4,5-tetrahydro-7-chloro-1H-3-benzazepine for N-nitroso-2,3,4,5-tetrahydro-1H-3-benzazepine there is obtained 3-amino-2,3,4,5-tetrahydro-7-chloro-1H-3-benzazepine, hydrochloride.

EXAMPLE 37

3-Amino-2,3,4,5-tetrahydro-7-methyl-1H-3-benzazepine, hydrochloride

Following the procedure of Example 35, but substituting 2,3,4,5-tetrahydro-7-methyl-1H-3-benzazepine for 2,3,4,5-tetrahydro-1H-3-benzazepine there is obtained 3-amino-2,3,4,5-tetrahydro-7-methyl-1H-3-benzazepine, hydrochloride.

EXAMPLE 38

3-Amino-2,3,4,5-tetrahydro-7-trifluoromethyl-1H-3-benzazepine, hydrochloride

Following the procedure of Example 35, but substituting 2,3,4,5-tetrahydro-7-trifluoromethyl-1H-3-benzazepine for 2,3,4,5-tetrahydro-1H-3-benzazepine there is obtained 3-amino-2,3,4,5-tetrahydro-7-trifluoromethyl-1H-3-benzazepine, hydrochloride.

EXAMPLE 39

3-Amino-2,3,4,5-tetrahydro-7-methoxy-1H-3-benzazepine, hydrochloride

Following the procedure of Example 35, but substituting 2,3,4,5-tetrahydro-7-methoxy-1H-3-benzazepine for 2,3,4,5-tetrahydro-1H-3-benzazepine there is obtained 3-amino-2,3,4,5-tetrahydro-7-methoxy-1H-3-benzazepine, hydrochloride.

EXAMPLE 40

3-Amino-2,3,4,5-tetrahydro-7-benzyloxy-1H-3-benzazepine, hydrochloride

Following the procedure of Example 35, but substituting 2,3,4,5-tetrahydro-7-benzyloxy-1H-3-benzazepine for 2,3,4,5-tetrahydro-1H-3-benzazepine there is obtained 3-amino-2,3,4,5-tetrahydro-7-benzyloxy-1H-3-benzazepine, hydrochloride.

EXAMPLE 41

3-Amino-2,3,4,5-tetrahydro-7,8-dichloro-1H-3-benzazepine, hydrochloride

Following the procedure of Example 35, but substituting 2,3,4,5-tetrahydro-7,8-dichloro-1H-3-benzazepine for 2,3,4,5-tetrahydro-1H-3-benzazepine there is obtained 3-amino-2,3,4,5-tetrahydro-7,8-dichloro-1H-3-benzazepine, hydrochloride.

EXAMPLE 42

3-Amino-2,3,4,5-tetrahydro-7,8-dimethoxy-1H-3-benzazepine, hydrochloride

Following the procedure of Example 35, but substituting 2,3,4,5-tetrahydro-7,8-dimethoxy-1H-3-benzazepine for 2,3,4,5-tetrahydro-1H-3-benzazepine there is obtained 3amino-2,3,4,5-tetrahydro-7,8-dimethoxy-1H-3-benzazepine, hydrochloride.

EXAMPLE 43

3-Amino-2,3,4,5-tetrahydro-7,8-dimethyl-1H-3-benzazepine, hydrochloride

Following the procedure of Example 35, but substituting 2,3,4,5-tetrahydro-7,8-dimethyl-1H-3-benzazepine for 2,3,4,5-tetrahydro-1H-3-benzazepine there is obtained 3-amino-2,3,4,5tetrahydro-7,8-dimethyl-1H-3-benzazepine, hydrochloride.

It is understood that the acid-addition salts of Examples 1 through 18 and 35 through 43 can be converted to their free bases by any conventional means.

The invention may be variously otherwise embodied within the scope of the appended claims.

What is claimed is:

1. A compound selected from the group consisting of a compound of the formula:

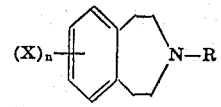

and the non-toxic acid-addition salts thereof, wherein X is selected from the group consisting of hydrogen, lower alkyl, lower alkoxy, benzyloxy, lower alkyl mercapto, di(lower alkyl)amino, halo and trifluoromethyl; n is a positive integer less than three; and R is selected from the group consisting of amino, di(lower alkyl) amino alkyl, and carboximidoyl guanidine.

2. A compound according to claim 1 which comprises the non-toxic acid-addition salts of 3-[3-(dimethylamino)propyl]-2,3,4,5-tetrahydro-1H-3-benzazepine.

3. A compound according to claim 1 which comprises the non-toxic acid-addition salts of 3-[3-(dimethylamino)propyl]-2,3,4,5-tetrahydro-7-methoxy-1H-3-benzazepine.

4. A compound according to claim 1 which comprises the non-toxic acid-addition salts of 3-[3-(dimethylamino)propyl]-2,3,4,5-tetrahydro-7-chloro-1H-3-benzazepine.

5. A compound according to claim 1 which comprises the non-toxic acid-addition salts of 3-[3-(dimethylamino)propyl]-2,3,4,5-tetrahydro-7,8-dinitro-1H-3-benzazepine.

6. A compound according to claim 1 which comprises the non-toxic acid-addition salts of 3-[3-(dimethylamino)propyl]-2,3,4,5-tetrahydro-7,8-dimethoxy-1H-3-benzazepine.

7. A compound which comprises the non-toxic acid-addition salts of 3-amino-2,3,4,5-tetrahydro-1H-3-benzazepine.

8. A compound which comprises the non-toxic acid-addition salts of [3-amino-2,3,4,5-tetrahydro-1H-3-benzazepine) carbo-ximidoyl] guanidine.

9. A compound selected from the group consisting of a compound of the formula:

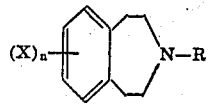

and the non-toxic acid-addition salts thereof, wherein X is selected from the group consisting of hydrogen, lower alkyl, lower alkoxy, benzyloxy, lower alkyl mercapto, di(lower alkyl)amino, halo and trifluoromethyl; n is a positive integer less than three; and R is amino.

10. A compound selected from the group consisting of a compound of the formula:

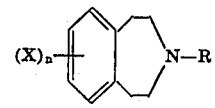

and the non-toxic acid-addition salts thereof, wherein X is selected from the group consisting of hydrogen, lower alkyl, lower alkoxy, benzyloxy, lower alkyl mercapto, di(Lower alkyl) amino, halo and trifluoromethyl; $n$ is a positive integer less than 3; and R is carboximidoylguanidine.

* * * * *